US009812888B2

(12) United States Patent
Leblanc et al.

(10) Patent No.: US 9,812,888 B2
(45) Date of Patent: Nov. 7, 2017

(54) ELECTROCHEMICAL CELL OR BATTERY WITH REDUCED IMPEDANCE AND METHOD FOR PRODUCING SAME

(71) Applicant: Bathium Canada Inc., Boucherville (CA)

(72) Inventors: Patrick Leblanc, Boucherville (CA); Frederic Cotton, Montreal (CA); Thierry Guena, Longueuil (CA); Cedric Reboul-Salze, Montreal (CA); Marc Deschamps, Quimper (FR); Thomas Calvez, Quimper (FR); Vincent Bodenez, Quimper (FR); Philippe Bernardo, Quimper (FR); Mathieu Dru, Ergue-Gaberic (FR)

(73) Assignee: Bathium Canada Inc., Boucherville (CA)

( * ) Notice: Subject to any disclaimer, the term of this patent is extended or adjusted under 35 U.S.C. 154(b) by 47 days.

(21) Appl. No.: 14/156,563

(22) Filed: Jan. 16, 2014

(65) Prior Publication Data
US 2014/0197799 A1    Jul. 17, 2014

Related U.S. Application Data

(60) Provisional application No. 61/753,282, filed on Jan. 16, 2013.

(51) Int. Cl.
*H02J 7/00* (2006.01)
(52) U.S. Cl.
CPC .............................. *H02J 7/0075* (2013.01)

(58) Field of Classification Search
CPC ........................................................ H02J 7/63
USPC ............................................................. 320/126
See application file for complete search history.

(56) References Cited

U.S. PATENT DOCUMENTS

| 5,998,968 A | 12/1999 | Pittman et al. |
| 6,873,134 B2 | 3/2005 | Canter et al. |
| 2007/0166617 A1* | 7/2007 | Gozdz ................... H01M 4/133 429/231.95 |
| 2008/0090138 A1* | 4/2008 | Vu .......................... H01M 2/16 429/129 |
| 2013/0207618 A1* | 8/2013 | Renken ............... H01M 10/425 320/155 |

FOREIGN PATENT DOCUMENTS

| JP | 2009-170278 | 7/2009 |
| JP | 2011-159545 | 8/2011 |
| JP | 2012-256430 | 12/2012 |
| WO | WO2005/031892 | 4/2005 |
| WO | WO2012/169065 | 12/2012 |

* cited by examiner

*Primary Examiner* — Thuan Do
(74) *Attorney, Agent, or Firm* — McMillan LLP

(57) ABSTRACT

The invention disclosed is a method for decreasing the internal resistance or impedance of a battery or electrochemical cell is described which comprises the step of discharging the battery or cell until it reaches an overdischarge condition and maintaining the battery or cell in the overdischarge condition for a period of time sufficient to effect a diminution of the internal resistance or impedance of a battery or electrochemical cell; and a battery or electrochemical cell having a reduced impedance.

7 Claims, 8 Drawing Sheets

ELECTROCHEMICAL CELL OR BATTERY WITH REDUCED IMPEDANCE AND METHOD FOR PRODUCING SAME

FIELD OF THE INVENTION

The present invention relates to a lithium electrochemical cell and/or battery, and more specifically to a lithium electrochemical cell and/or battery having a reduced internal resistance or impedance and a method for lowering the internal resistance or impedance of the cell and/or battery.

BACKGROUND OF THE INVENTION

Lithium batteries have become the main energy storage device among all chemical power sources for use in portable electronic devices and electric power sources for electric or hybrid vehicles.

Recently, Lithium batteries having an iron phosphate based positive electrode have become the most promising type of lithium batteries for their safety factor and durability.

Lithium batteries exhibit a small initial internal resistance or impedance at the beginning of their life which must remain stable throughout the life of the battery. An increase of the internal resistance would have the effect, throughout the cycle life of the battery, of slowly reducing the battery performance until, after many cycles of charge and discharge, the battery capacity has faded to a level in which the battery no longer performs to the requirements of the application it powers. The higher the initial internal resistance is, the faster the battery capacity will fade and therefore the shorter the battery life will be.

Reducing the initial internal resistance or impedance of the battery would therefore increase the battery capacity at the beginning of its cycle life and also reduce the capacity fade of the battery throughout its cycle life thereby improving both the power delivery capacity of the battery and its longevity.

Therefore, there is a need for a lithium battery or cells having a lower internal resistance or impedance than other similar battery or cells and/or a method for lowering the impedance of the battery or cells.

SUMMARY OF THE INVENTION

It is an object of the present invention to ameliorate at least some of the inconveniences present in the prior art.

It is also an object of the present invention to provide a lithium battery or cells having a lower internal impedance than other similar batteries or cells.

In one aspect, the invention provides a method for reducing the impedance of a battery or cells.

Embodiments of the present invention each have at least one of the above-mentioned objects and/or aspects, but do not necessarily have all of them. It should be understood that some aspects of the present invention that have resulted from attempting to attain the above-mentioned objects may not satisfy these objects and/or may satisfy other objects not specifically recited herein.

Additional and/or alternative features, aspects, and advantages of embodiments of the present invention will become apparent from the following description, the accompanying drawings, and the appended claims.

BRIEF DESCRIPTION OF THE DRAWINGS

For a better understanding of the present invention, as well as other aspects and further features thereof, reference is made to the following description which is to be used in conjunction with the accompanying drawings, where.

DETAILED DESCRIPTION OF THE PREFERRED EMBODIMENTS

Figure 1:
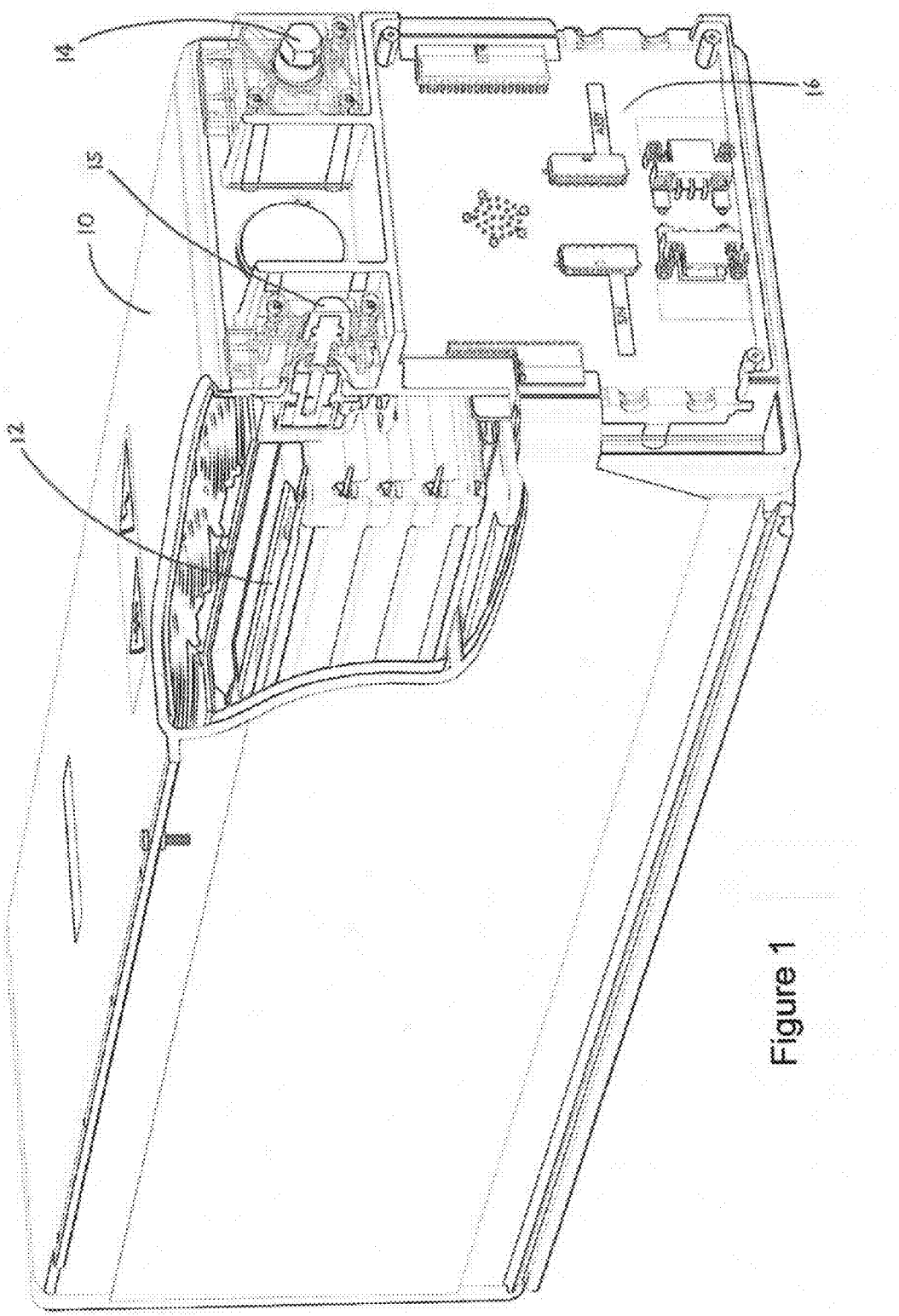
FIG. 1 is a perspective view of an example of a battery comprising a plurality of electrochemical cells.

FIG. 1 illustrates a lithium metal polymer battery 10, with a cut-away portion showing its internal components. In this specific example, the battery 10 includes a plurality of electrochemical cells 12 stacked one against the other, connected together in series and connected to battery poles 14 and 15. The stack of electrochemical cells 12 is connected to an electronic control board 16 that controls the charge and discharge mode of the electrochemical cells 12 and monitors various parameters of the battery 10.

Figure 2:
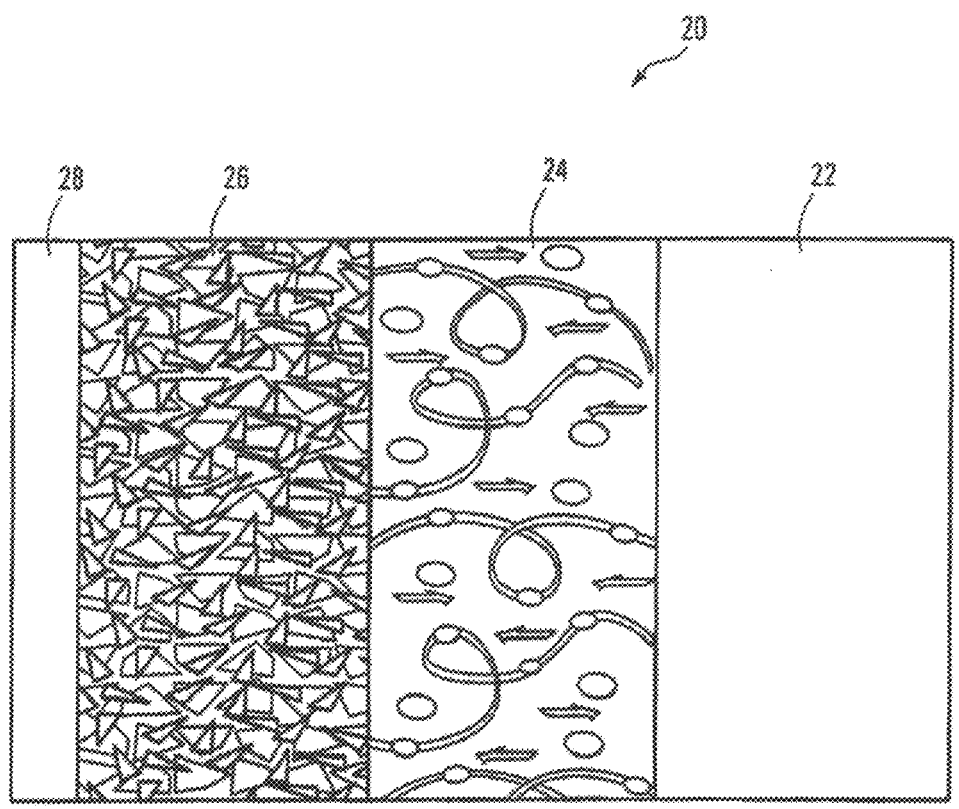
FIG. 2 is a schematic view of an electrochemical cell laminate.

Each electrochemical cell 12 consists of a multi layer assembly of laminates 20, illustrated schematically in FIG. 2. Each laminate 20 comprises a metallic lithium foil anode 22 that acts as a lithium source, a solid polymer electrolyte separator 24 that acts as a lithium ion carrier, and a cathode 26 having $LiFePO_4$ as its electrochemically active material. The cathode 26 is made of a compound of lithium iron phosphate and polymer binder, and is adapted to reversibly intercalate lithium ions. The cathode 26 is supported by a current collector 28 that is operative to electrically connect the cathode 26 to other cathodes 26 in the electrochemical cell 12.

Figure 3:
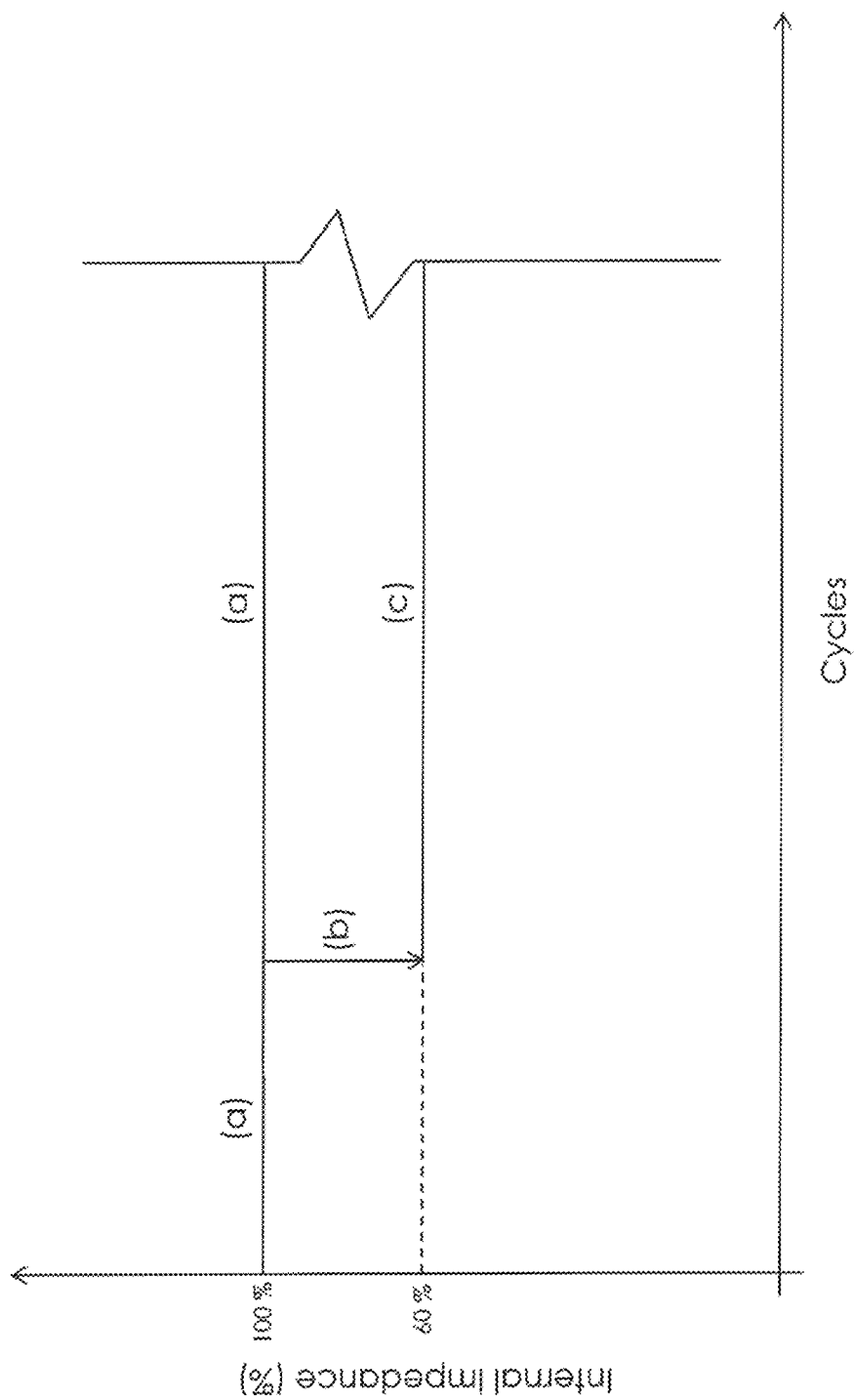
FIG. 3 is a graph illustrating the reduction of the internal impedance of an electrochemical cell according to the invention.

With reference to FIG. 3, the internal resistance or impedance of an electrochemical cell 12 comprising a lithium metal anode sheet 22, a solid polyethylene oxide based electrolyte 24, and a cathode 26 comprised of $LiFePO_4$ insertion material mixed in the same solid polyethylene oxide based electrolyte generally behaves as illustrated by line (a) in FIG. 3. The initial internal resistance or impedance of the cell 12 is schematically shown as 100% and the internal resistance remains relatively stable throughout successive cycles of charge and discharge for the entire cycle life of the electrochemical cell 12.

Figure 4:
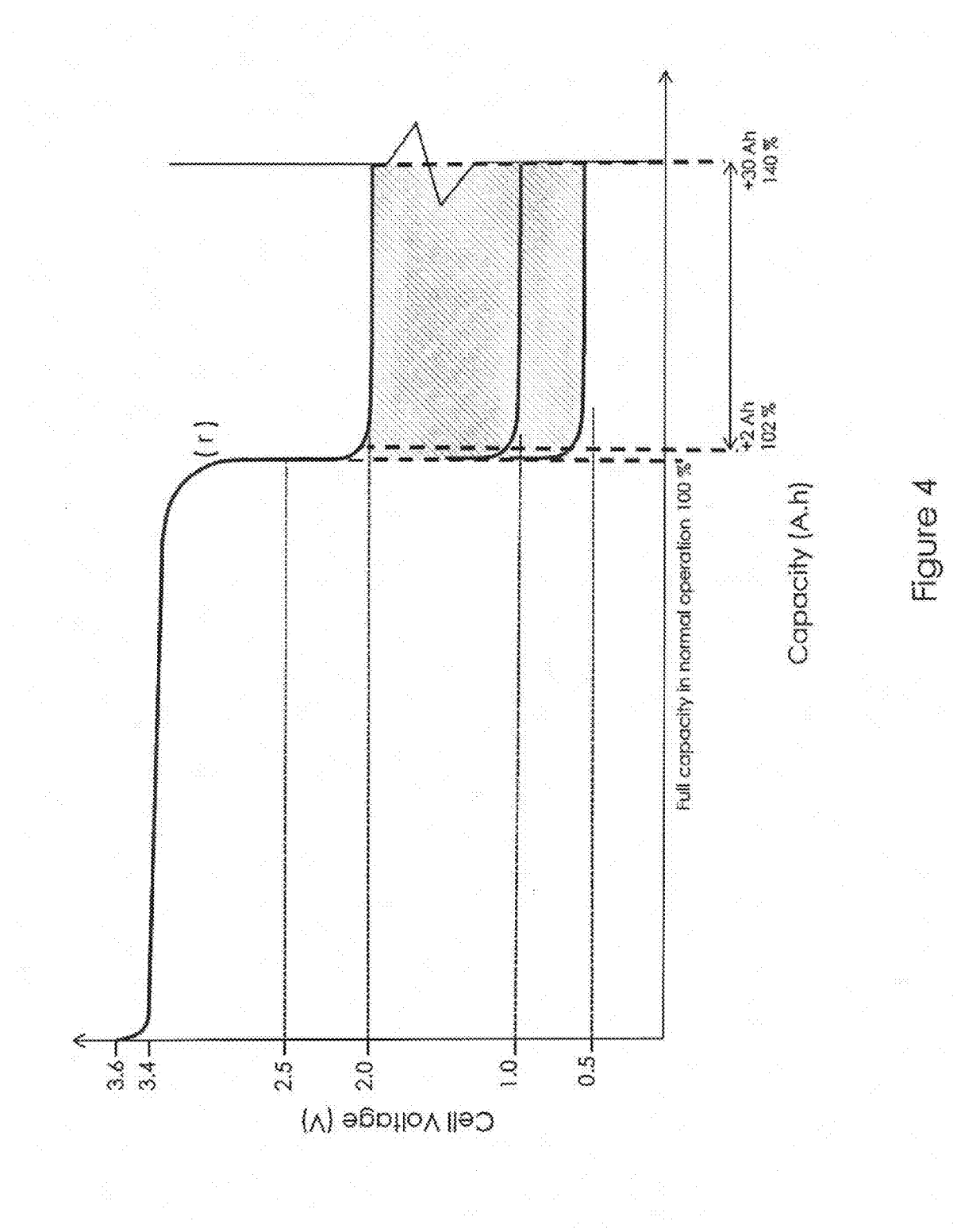
FIG. 4 is a graph illustrating a discharge curve extending into an overdischarge of a lithium electrochemical cell comprising a $LiFePO_4$ based positive electrode.

FIG. 4 is a graph illustrating the discharge curve of the electrochemical cell 12 described above from a fully charge state and extending into an overdischarge state. The fully charged electrochemical cell 12 has an initial voltage of about 3.6 V. When a discharge begins, the voltage decreases rapidly to the operational plateau of 3.4 V in which the electrochemical cell 12 delivers most of its energy until its full capacity is used in normal condition. At the end of its operational plateau, the electrochemical cell 12 has discharged 100% of its rated capacity. If the electrochemical cell 12 continues to be discharged or is forced to continue discharging, it reaches a slope (r) wherein its voltage decreases rapidly to a second plateau somewhere between 0.5 V and 2.0 V. This second plateau may be as low as 0.5 V if the discharge current is higher than C/5 or more and may be as high as 2.0V if the discharge current is very low in the order of C/20. Therefore, depending on the current discharged by the electrochemical cell 12, the second plateau may vary between approximately 0.5 V and 2.0 V. For that reason, the second plateau is illustrated in FIG. 4 as being within the range of 0.5 V to 2.0 V. At C/8, the second plateau is approximately between 0.8 V and 1.2 V. This second plateau is much longer than the operational plateau of 3.4 V and is not shown in its full length in the graph of FIG. 4 for spatial reasons. When the electrochemical cell 12 reaches this second plateau of between 0.5 V and 2.0 V, the electrochemical cell 12 enters an overdischarge condition where it is discharging above 100% of its rated capacity. In an overdischarge condition, the electrochemical cell 12 is believed to begin an irreversible degradation that will eventually render the electrochemical cell 12 less operative if for instance the electrochemical cell 12 is discharged to 150% of its rated capacity. In operation, the voltage of the electrochemical cell 12 is monitored via electronic control board 16 that cuts off the power delivery of the electrochemical cell 12 when the latter reaches the end of the operational plateau to prevent the electrochemical cell 12 from reaching the overdischarge plateau in order to preserve the health of the electrochemical cell 12.

Through various studies of the behaviour of the electrochemical cells 12 in overdischarge conditions, the inventors have discovered surprisingly that letting the electrochemical cell 12 reach the second plateau and continuing the discharge for a period of time, such that the electrochemical cell 12 continues to discharge beyond 100% of its rated capacity, has actual benefits on the initial internal resistance or impedance of the cells 12.

It was found that when a cell 12 is overdischarged to the point where it reaches the second plateau of between 0.5 V and 2.0 V depending on the current discharged and continuing the overdischarge for a period of time in which from 2 Ah to 30 Ah is discharged (corresponding to 102% to 140% of the cell rated capacity) as shown in FIG. 4; when the cell 12 is recharged to its fully charged nominal voltage of 3.6 V and discharged a second time, its internal resistance or impedance had decreased by as much as 40%. The internal resistance or impedance of the cell 12 no longer reached 100% of its initial internal resistance or impedance previously described with reference to FIG. 3 but its internal resistance reached about 60% of its initial value. To achieve this diminution of internal resistance, the electrochemical cell 12 is preferably maintained in the overdischarge plateau for 6 to 15 Ah, thereby reaching 108% to 120% of its rated capacity.

The length of the operational plateau of a given electrochemical cell defines the rated discharge capacity of the electrochemical cell or battery at its operational temperature for a given discharge rate (C/4, C/6, C/10 . . . )

As illustrated in FIG. 3, the internal resistance or impedance of a cell 12 that was not put through a temporary overdischarge condition is initially 100% and remains relatively stable throughout successive cycles of charge and discharge as illustrated by the portion (a) of the impedance curve. The effect of putting cell 12 through a temporary overdischarge condition even after numerous cycles generates a sharp decrease of its internal impedance as illustrated by the portion (b) of the impedance curve. The impedance of the cell 12 has been dramatically diminished by up to 40% where it reaches the 60% mark on the graph. After the process of discharging the cell into the overdischarge plateau, the internal impedance of the cell 12 remains stable at that level of 60% through successive cycles of charge and discharge for the remainder of its cycle life as illustrated by the portion (c) of the impedance curve.

The electrochemical reduction of the cathode 26 of the cell 12 through a prolonged or forced overdischarge has the effect of decreasing the internal resistance or impedance of the cell 12.

The diminution of the impedance of the cell 12 through a discharge into the overdischarge plateau is ideally performed when the electrochemical cell 12 is new. When the electrochemical cell 12 is initially produced, it is in a discharge state and is positioned at the end of the operational plateau on the graph of FIG. 4. In this particular case, the electrochemical cell 12 does not have to be discharged through its operational plateau. It can be forced discharged directly into the overdischarge plateau without going through the process of starting from the fully charged state. However, the diminution of the impedance of the cell 12 through a discharge into the overdischarge plateau may be performed at any time throughout the life of the cell 12 or battery with similar results.

It was also found that a single discharge into the overdischarge plateau of the electrochemical cell 12 is effective for diminishing the internal impedance of the cell 12. The requisite is that the electrochemical cell 12 spent a sufficient amount of time, or more precisely of Amp-hours, or within the 102% to 140% of its rated capacity in the overdischarged state or on the overdischarge plateau to produce the diminution of internal resistance or impedance. The objective of lowering the impedance of the electrochemical cell 12 may be achieved by a single discharge into the overdischarge plateau or by multiple discharge into the overdischarge plateau of short periods of time which add up to the requisite amount of Amp-hours. It is therefore possible to repeat the process of discharging the cell 12 to reach the overdischarge plateau more than once.

In the production of a battery 10 comprising a plurality of electrochemical cells 12, the process of discharging the battery 10 into the overdischarge plateau is preferably modified slightly to accommodate the variation of capacities of the individual cells 12 making up the battery 10. It is known that all electrochemical cells 12 making up a battery do not have the exact same capacity and therefore each individual cell 12 may not reach the end of the operational plateau simultaneously.

Figure 5:
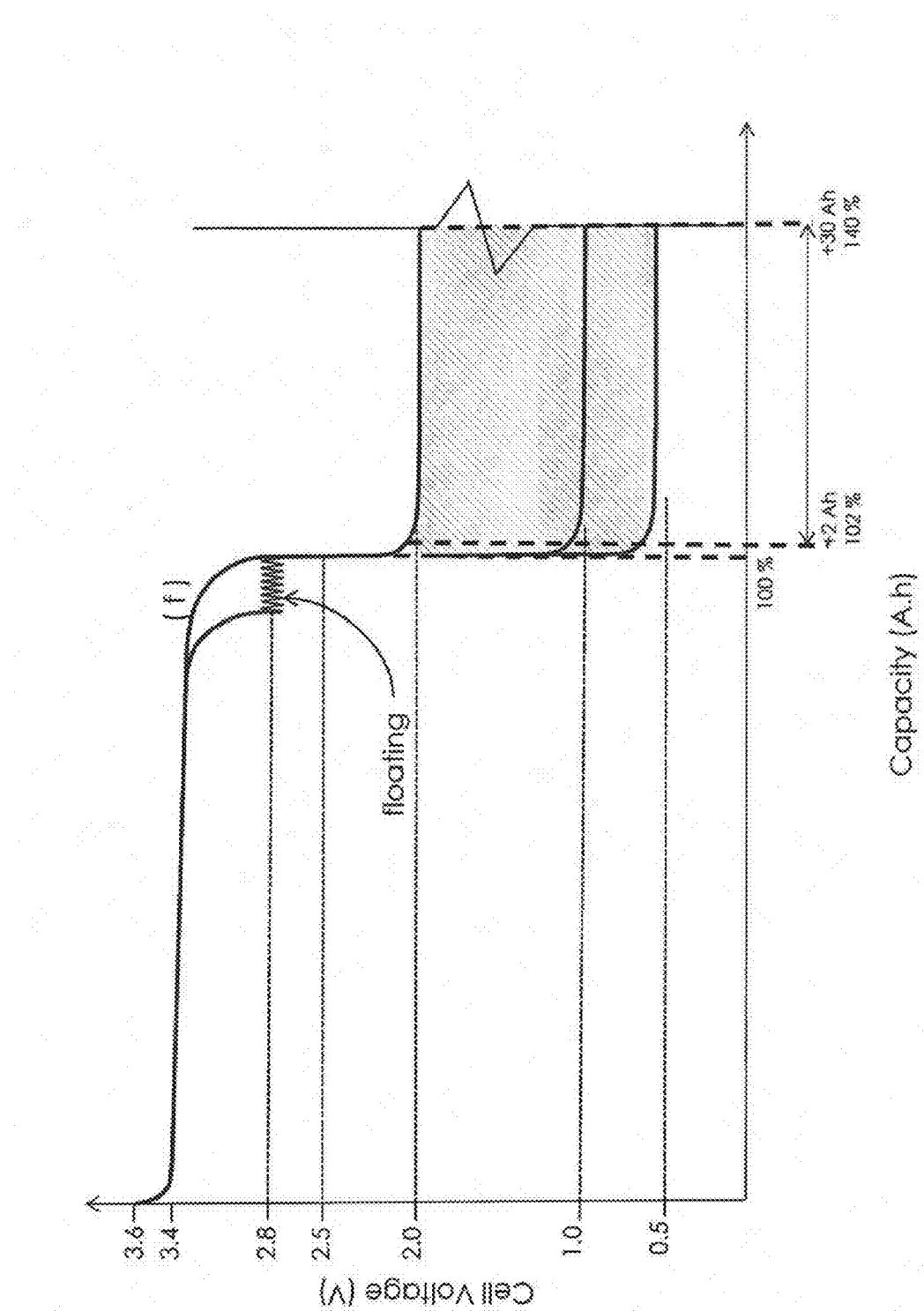
FIG. 5 a graph illustrating the discharge curves extending into overdischarge of a plurality of lithium electrochemical cells in a battery.

To insure that all cells 12 of the battery 10 spend an equal amount of time at the overdischarge plateau, each cell 12 should first reach the slope (r). With reference to FIG. 5, a battery comprising a plurality of cells 12 illustrated by a single line on the discharge graph of FIG. 5 is first discharged to the end of the operational plateau of approximately 3.4 V to reach a floating voltage below 3.4 V such as for example 2.8 V. The floating voltage may be anywhere from 3.2V down to 2.0 V. At the floating voltage, the discharge at constant current is interrupted and the battery 10 is floated until all electrochemical cells 12 of the battery 10 reach the same voltage or level of charge in order to regroup the cells 12 to compensate for their different capacity. As illustrated, a cell (f) is more capacitive and its operational plateau extends farther than the other cells 12. By floating the battery 10 at a floating voltage (2.8 V), the more capacitive cell (f) eventually reaches the end of its operational plateau and its voltage falls down to the floating voltage level already reached by the other cells 12. At that point, the battery 10 is discharge into the overdischarge plateau until the battery 10 has reached 102% to 140% of its rated capacity in the overdischarged state or on the overdischarge plateau to produce the diminution of internal resistance or impedance. The floating of the battery 10 insures that all cells 12, including cell (f), go through the temporary forced overdischarge condition that has the effect of decreasing the internal impedance of all cells 12 of the battery 10.

Figure 6:
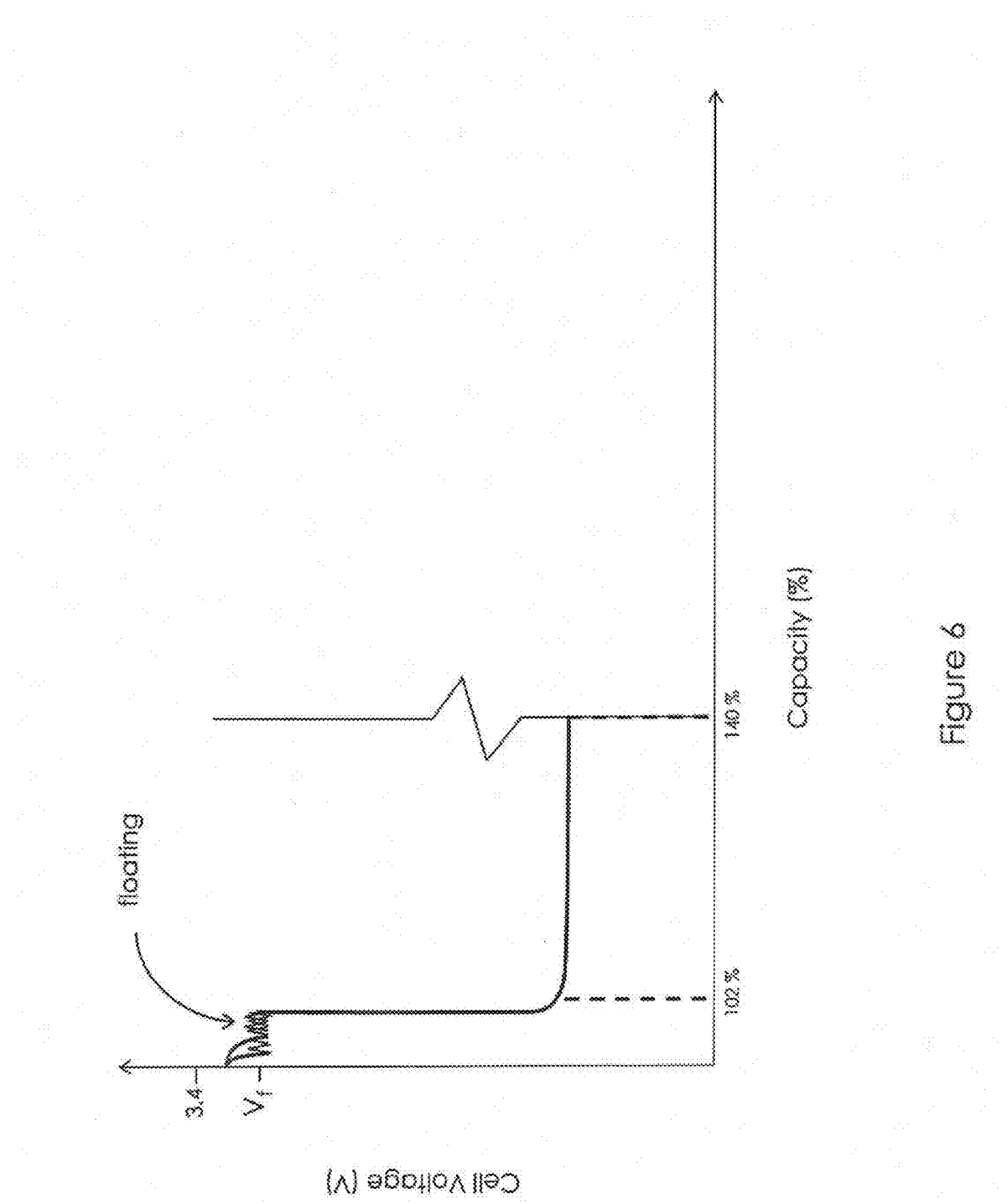
FIG. 6 a graph illustrating the discharge curves extending into overdischarge of a plurality of lithium electrochemical cells in a new battery.

As previously stated, when a battery 10 comprising a plurality of electrochemical cells 12 is produced, its cells 12 are in a discharge state and therefore already at the end of their operational plateau and therefore the battery 10 needs not go through the full discharge curve to effect the diminution of the internal impedance of all cells 12 of the battery 10. As illustrated in FIG. 6, the starting point of the electrochemical cells 12 of a new battery is slightly below the operational plateau of 3.4 V. To insure that all cells 12 of the new battery 10 spend an equal amount of time at the overdischarge plateau, the new battery is also floated for a while to make sure that all electrochemical cells 12 of the new battery 10 reach the same voltage in order to regroup the cells 12 to compensate for their different capacity. Then, the new battery 10 is force discharged into the overdischarge plateau for a period of time until the battery 10 has reached 102% to 140% of its rated capacity in the overdischarged state or on the overdischarge plateau to produce the diminution of internal resistance or impedance of the cells 12.

Figure 7:
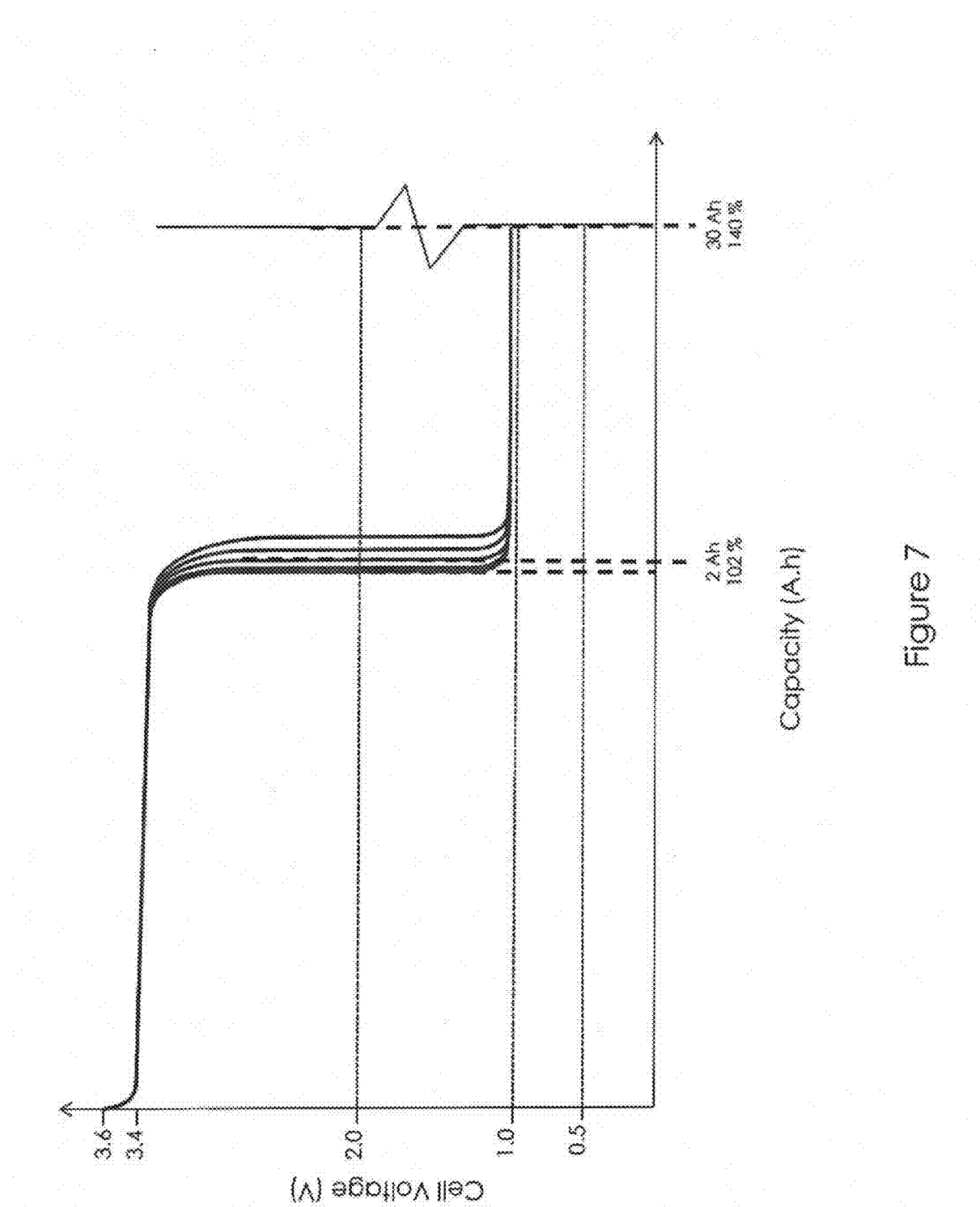
FIG. 7 a graph illustrating the discharge curves extending into overdischarge of a plurality of lithium electrochemical cells in a battery.

It is also possible to discharge the battery 10 into the overdischarge plateau without the added step of floating it at a floating voltage (2.8 V). In this particular case, each cell 12 of the battery is allowed to reach the overdischarge plateau at its own pace as shown in FIG. 7. Since it is not possible to monitor the voltage of each cell 12 of the battery, the time spent into the overdischarge state may be extended slightly to ensure that each cell 12 spends the requisite time into the temporary overdischarge condition to effect the diminution of the internal impedance of all cells 12 of the battery 10. The battery 10 may be forced discharge until it reaches 110% of its rated capacity in order to ensure that each cell 12 spends the requisite time into the overdischarge condition to effect the diminution of the internal impedance of all cells 12 of the battery 10.

Figure 8:
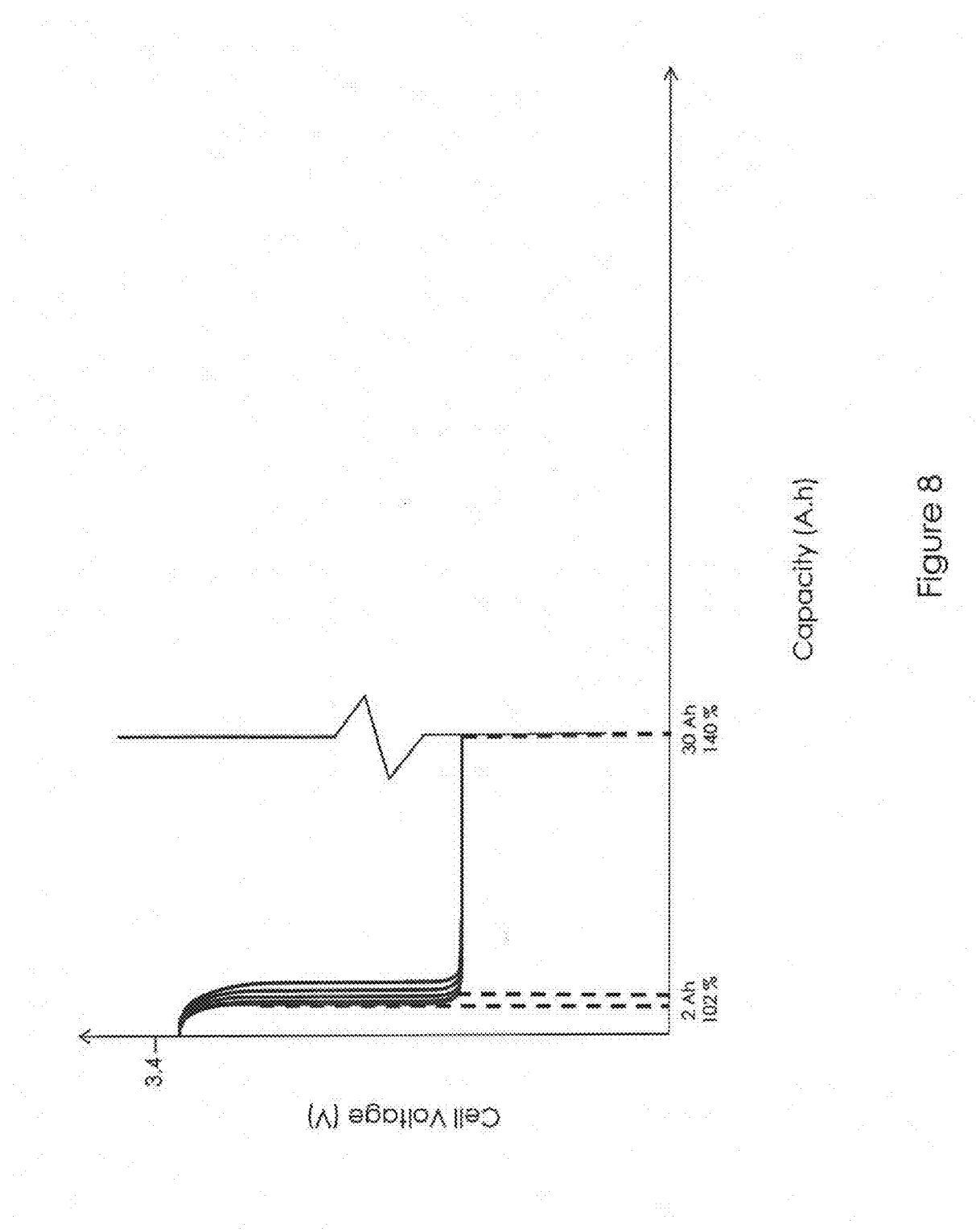
FIG. 8 a graph illustrating the discharge curves extending into overdischarge of a plurality of lithium electrochemical cells in a new battery

As previously stated, when a battery 10 comprising a plurality of electrochemical cells 12 is produced, its cells 12 are in a discharge state and therefore already at the end of their operational plateau and therefore the battery 10 needs not go through the full discharge curve to effect the diminution of the internal impedance of all cells 12 of the battery 10. As illustrated in FIG. 8, the starting point of the electrochemical cells 12 of a new battery is slightly below the operational plateau of 3.4 V. If the new battery 10 is not floated as described with reference to FIG. 6, each cell 12 of the battery 10 is allowed to reach the overdischarge plateau at its own pace. To insure that all cells 12 of the new battery 10 spend a sufficient amount of time at the overdischarge plateau to effect the diminution of the internal impedance of all cells 12, The battery 10 is preferably forced discharge until it reaches 110% or more of its rated capacity.

It is believed that the process of putting the cells in a temporary forced overdischarge condition in order to decrease the internal resistance or impedance of the cells is also applicable to any type of cells such as those having spinel type cathode material ($LiMn_2O_4$, etc.) and other cathode material ($LiNiO_2$, etc.). The pre-requisite is to have a source of lithium sufficient to electrochemically reduce the cathode to a low potential corresponding to an overdischarge condition.

Modifications and improvements to the above-described embodiments of the present invention may become apparent to those skilled in the art. The foregoing description is intended to be exemplary rather than limiting. The scope of the present invention is therefore intended to be limited solely by the scope of the appended claims.

What is claimed is:

1. A method for decreasing the internal resistance or impedance of a battery or electrochemical cell having a rated capacity, the method comprising the step of discharging the battery or electrochemical cell beyond its rated capacity wherein it reaches an overdischarge condition and continuing the discharge to maintain the battery or cell in the overdischarge condition until the battery or electrochemical cell reaches between 102% and 140% of its rated capacity to effect a diminution of the internal resistance or impedance of a battery or electrochemical cell.

2. A method for decreasing the internal resistance or impedance of a battery or electrochemical cell as defined in claim 1 wherein the battery or cell is maintain in an overdischarge condition until the battery or electrochemical cell reaches between 108% and 120% of its rated discharge capacity.

3. A method for decreasing the internal resistance or impedance of a battery or electrochemical cell as defined in claim 1, wherein the battery or cell comprises at least one anode and at least one cathode and wherein the least one cathode is electrochemically reduced through a forced overdischarge to effect the diminution of internal resistance or impedance.

4. A method for decreasing the internal resistance or impedance of a battery or electrochemical cell as defined in claim 1, wherein the step of discharging the battery or electrochemical cell until it reaches the overdischarge condition is performed when the battery or electrochemical cell is new.

5. A method for decreasing the internal resistance or impedance of a battery or electrochemical cell as defined in claim 1, wherein multiple discharges reaching the overdischarge condition of short periods of time are done which add up to a requisite amount of Amp-hours in the overdischarge condition to effect a diminution of the internal resistance or impedance.

6. A method for decreasing the internal resistance or impedance of a battery as defined in claim 1, wherein the battery is floated at a floating voltage until all the electrochemical cells of the battery reach the same voltage prior to discharging the battery until it reaches the overdischarge condition.

7. A battery or electrochemical cell having a rated capacity, the battery or electrochemical cell having an internal resistance or impedance reduced by a process of discharging the battery or electrochemical cell beyond its rated capacity wherein it reaches an overdischarge condition and continuing the discharge to maintain the battery or cell in the overdischarge condition until the battery or electrochemical cell reaches between 102% and 140% of its rated capacity to effect a diminution of the internal resistance or impedance of a battery or electrochemical cell.

* * * * *